June 19, 1928.
H. V. REED
DRIVEN PLATE FOR FRICTION CLUTCHES
Filed May 2, 1927
1,674,225
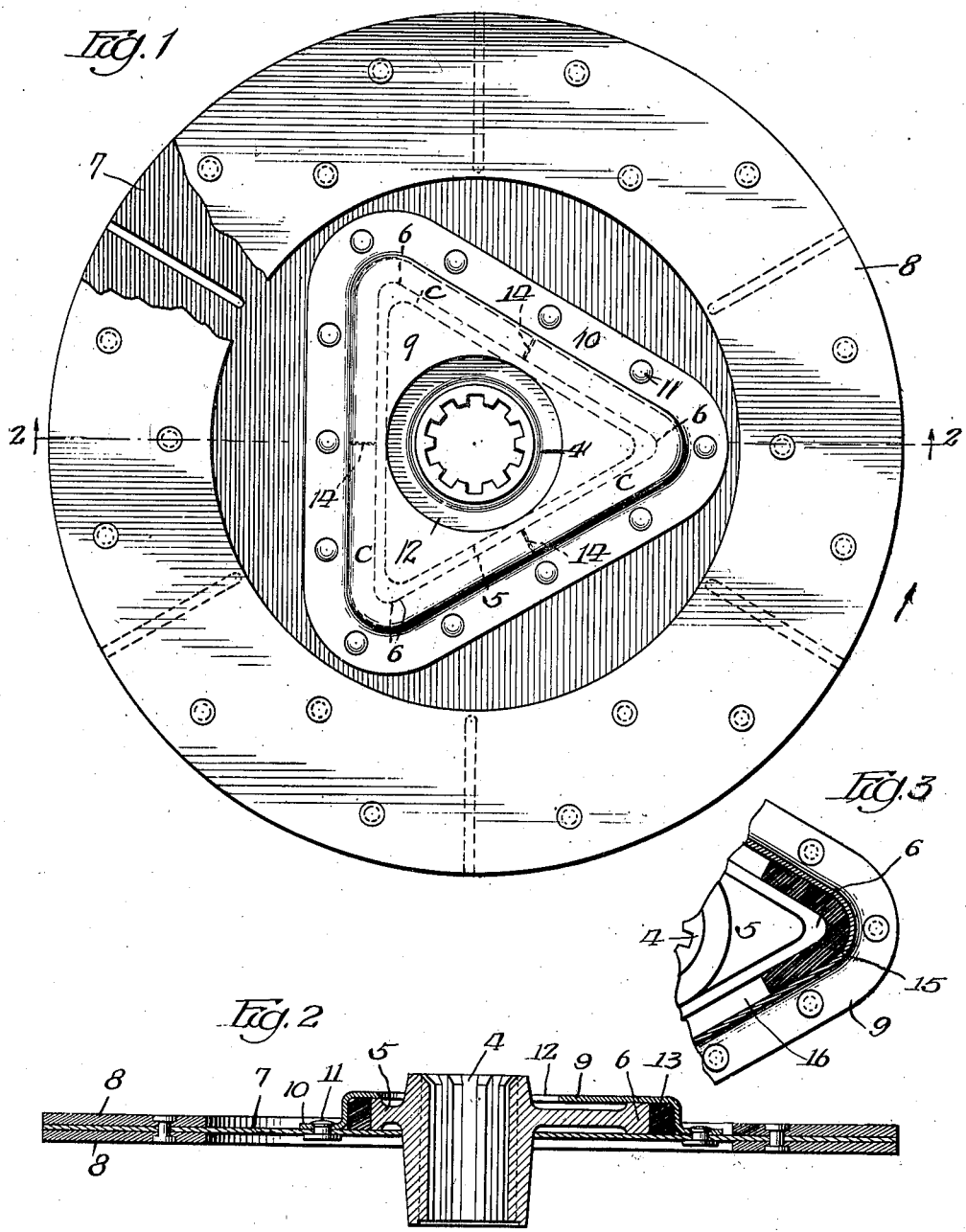

Patented June 19, 1928.

1,674,225

UNITED STATES PATENT OFFICE.

HAROLD V. REED, OF CHICAGO, ILLINOIS, ASSIGNOR TO THE BORG & BECK COMPANY, OF CHICAGO, ILLINOIS, A CORPORATION OF ILLINOIS.

DRIVEN PLATE FOR FRICTION CLUTCHES.

Application filed May 2, 1927. Serial No. 188,180.

This invention relates to friction clutches of the kind wherein a friction plate driven member is interposed between two parts of a driving member and is adapted to be gripped or clamped by the parts under sufficient pressure to impart motion from the driving member to the driven member.

The object of the invention is to provide a flexible driven plate of novel construction for friction clutches which will absorb the noises due to periodic vibrations of the engine and prevent them from being carried forward to the transmission where they would become audible and objectionable.

Another object of the invention is to provide a driven plate of novel construction which is capable of torsional flexibility within itself to absorb vibration and other noises emanating from the engine with which the clutch embodying the driven plate is mechanically connected.

Further objects of the invention are to provide a novel driven plate which will reduce spinning movement and thereby facilitate shifting of gears; to provide a yielding cushion having extended contact surface between two parts of the driven plate; to enable the metal parts to be made by stamping operations; and to provide a driven plate of simple, light and substantial construction which will give long and efficient service.

In the accompanying drawings illustrating a selected embodiment of the invention:

Fig. 1 is an elevation of the driven plate with one of the friction rings partly broken away.

Fig. 2 is a sectional view on the line 2—2 of Fig. 1.

Fig. 3 is a detail view partly in section showing a slightly modified embodiment of the invention.

Referring to the drawings, the driven plate comprises a friction member which is mounted upon a centrally disposed hub member and a compressible cushion interposed between said members and having an extended contact surface so that movement of the friction member is communicated through the cushion, and by compression only of the cushion, to the hub member.

The hub member comprises a hub 4 having an integral flange 5 which is triangular in shape and has its three angles 6 symmetrically disposed about the hub 4. The friction member comprises a flat plate ring 7 which is mounted loosely on the hub against one side of the flange. Friction rings 8 are fastened to the plate at and adjacent its periphery and on opposite sides thereof. A casing 9 of triangular shape is provided with a peripheral flange 10 arranged to lie against the plate ring 7 and to which it is secured by rivets 11 or other suitable fastening devices. The casing has a centrally disposed opening 12 to receive the hub and between this opening and the flange 10 the casing is upset to receive the hub flange 5 and to form a chamber about the periphery of the hub flange. A cushion strip 13 is arranged in this chamber about the hub flange and within the casing. Thus the cushion is of substantially triangular shape and is confined in a substantially triangular chamber formed by the casing, the triangular hub flange and the plate ring so that it is free to work in the chamber, but is prevented from bulging or otherwise escaping from the chamber. The plate and the casing overlie the flange of the hub member, on opposite sides thereof and fit the hub flange comparatively snugly without binding, to permit relative movement of the hub member and the friction member freely while at the same time confining the cushion in the chamber formed between the hub member and the friction member and excluding dirt and other foreign matter therefrom.

The cushion may be a single strip extending throughout the triangular chamber with its ends at or about abutting, or it can be made in three sections, each section extending around one angle of the hub flange and the ends of the sections abutting, as indicated at 14, in Fig. 1. Whether the cushion is made in one continuous strip with its ends abutting or in three sections with the ends thereof abutting, there will be to all intents and purposes a continuous cushion in a triangular chamber between the hub member and the friction member which provides an extended contact surface and a strong, substantial and long-lived construction. I may, however, make the cushion in short sections 15 located at the angles of the chamber 16, as shown in Fig. 3. In this construction the cushion strips are of sufficient length for practical purposes under some conditions, and possibly for all, but my present preference is to provide driven plates with cushions which substantially fill the cushion chambers, for at least some clutches.

My invention provides a flexible cushion between the friction driving member and the hub driven member of the driven plate through which cushion movement of the driving member is communicated to the driven member. The cushion is confined snugly in the triangular chamber formed between the hub flange, the plate ring and the casing. When the friction member is revolved, in the direction indicated by the arrow in Fig. 1, the cushion will be compressed at the parts indicated by $c$ because the friction member will move relatively to the hub member, depending upon the resistance of the hub member, and the chamber will narrow correspondingly at that side of the angles thereof and correspondingly widen at the opposite sides of the angles so that the material of the cushion, which is confined within the chamber, may flow lengthwise of the cushion under compression and without being subjected to tension. This is a desirable quality of the invention because the cushion will obviously be subjected to constant working, to a more or less extent, while the driven plate is in service and this working is restricted to compression action which will keep the cushion alive and efficient, especially if it is made of rubber or rubber composition. I may make the cushion strip of rubber or rubber composition with or without cords or fabric or other binding material embedded therein, as may be found desirable to satisfy different conditions. The driven plate is particularly adapted for friction clutches for automotive vehicles, but obviously it can be employed in clutches for many other installations.

The interposition of a cushion between the friction member and the hub member of the driven plate is important for absorbing the noises which emanate from the engine and which would otherwise travel to the transmission, and also for facilitating gear shifting and for reducing the noises incident thereto. The cushion is confined within the chamber and notwithstanding the working compression to which it is subjected in service, it will retain its initial shape without loss of volume and without permanent displacement of any of its material. Therefore back lash or looseness between the friction member and the hub member is avoided and the strip at all times provides a satisfactory cushion filling the chamber and distributed substantially uniformly throughout the chamber when the driven plate is at rest and returning to this condition whenever the driven plate comes to rest. The triangular shape of the interengaging parts provides for an enlarged cushion of elongated shape and an efficient drive construction within the driven plate which is easily made and is not expensive. Whether the cushion is made of a single strip filling the chamber, or of a plurality of strips or sections filling the chamber, or of a plurality of strips partly filling the chamber, in all cases it is intended that the cushion shall be free within the chamber to work under the compression action to which it is subjected but without being tensioned, and in all cases the material of the cushion is free to flow and has ample space within which to flow within the chamber without being forced out of the chamber which would soon destroy its efficiency. The ring 7 of the friction member is a flat plate, circular in shape, and provided with a centrally disposed opening to receive the hub, and this plate, and the casing 9, may be stamped from sheet metal.

The triangular shape of the casing and the hub flange and the chamber therebetween and the cushion in the chamber provide an elongated cushion and three drive projections with three corresponding compression localities for the cushion, which, I deem to be a highly desirable, economical and efficient construction for the purposes intended.

I claim:

1. A driven plate for friction clutches comprising a hub member having a plurality of substantially straight and tangential side walls, a friction member loosely mounted on the hub member and having complementary straight and tangential side walls, and a compressible cushion interposed between and operatively engaged by said walls of said members.

2. A driven plate for friction clutches comprising a triangular shaped member having a centrally disposed hub therein, a friction member loosely mounted on the hub member, and a triangular shaped compressible cushion interposed between said members.

3. A driven plate for friction clutches comprising a hub member, a friction member loosely mounted on the hub member, there being a triangular shaped cushion chamber having parallel walls between said members, and a compressible cushion arranged in said chamber and interposed between and operatively engaged by said walls.

4. A driven plate for friction clutches comprising a member having a centrally disposed hub and three angular projections symmetrically disposed about the hub in the form of a triangle, a friction member loosely mounted on the hub and having a chamber to receive said projections, and a compressible cushion interposed between said members and arranged in said chamber and operatively engaged by the opposing walls of said members.

5. A driven plate for friction clutches comprising a hub member, a friction member loosely mounted on the hub member, there being a triangular shaped cushion chamber between said members, and a cushion entirely filling said chamber and interposed between said members.

6. A driven plate for friction clutches comprising a triangular shaped hub member, a friction member loosely mounted on the hub member and comprising a plate ring and a casing fastened to the plate ring and providing with the plate ring and the hub member a triangular shaped cushion chamber between said members, and a cushion arranged in said chamber and interposed between said members.

7. A driven plate for friction clutches comprising a member having a centrally disposed hub and a plurality of angular projections arranged about the hub, a friction member loosely mounted on the hub member and providing a cushion chamber about said projections and between said members, and cushion material arranged in said chamber about the apices of said projections and interposed between said members.

8. A driven plate for friction clutches comprising a member having a centrally disposed hub and an integral flange about the hub having a plurality of angular projections, a friction member loosely mounted on the hub member and comprising a plate ring, a casing fastened to the plate ring and bent to embrace the flange on the hub member and form with the plate ring and the hub flange a triangular shaped chamber between said members, and a cushion arranged in said chamber about the angular projections of said hub flange and interposed between said members.

HAROLD V. REED.